United States Patent [19]

Chernoff et al.

[11] Patent Number: 4,506,179
[45] Date of Patent: Mar. 19, 1985

[54] UNIVERSALLY MOUNTABLE MOTORS

[75] Inventors: Edward A. Chernoff, Brookville; Kirby M. Lindtveit, Plainview; Paul Levy, Lindenhurst, all of N.Y.

[73] Assignee: Motors & Armatures, Inc., Hauppauge, N.Y.

[21] Appl. No.: 256,340

[22] Filed: Apr. 22, 1981

[51] Int. Cl.³ .............................................. H02K 5/26
[52] U.S. Cl. ..................................... 310/91; 248/675; 310/42
[58] Field of Search ............. 310/91, 40 MM, 49, 162, 310/163, 258, 42, 71; 248/660, 662, 669, 295.1, 298, 499; 368/88, 160; 240/669, 675

[56] References Cited

U.S. PATENT DOCUMENTS

| | | | |
|---|---|---|---|
| 3,344,292 | 9/1967 | Hurst | 310/261 |
| 3,746,289 | 7/1973 | Johnsen | 310/91 |
| 4,426,593 | 1/1984 | Chernoff et al. | 310/91 |

FOREIGN PATENT DOCUMENTS 2327665  5/1977  France ................................. 310/91

Primary Examiner—William M. Shoop
Assistant Examiner—D. L. Rebsch
Attorney, Agent, or Firm—Ladas & Parry

[57] ABSTRACT

A universally mountable motor comprises an armature and first and second bearing brackets fitted to the armature at opposite faces thereof respectively and spanning a bore formed therein. A rotor is fitted in the bore and is supported to rotate in the bore by bearings mounted in the bearing brackets. The bearing brackets are secured to the armature by bolts, each of which has a threaded end which projects from one of the brackets. The first bracket is formed with wings which extend parallel to one another on opposite sides of the axis of rotation of the rotor and are formed each with at least one undercut slot. A screw can be fitted in the slot with a threaded portion projecting from the bracket to receive a stand-off.

15 Claims, 10 Drawing Figures

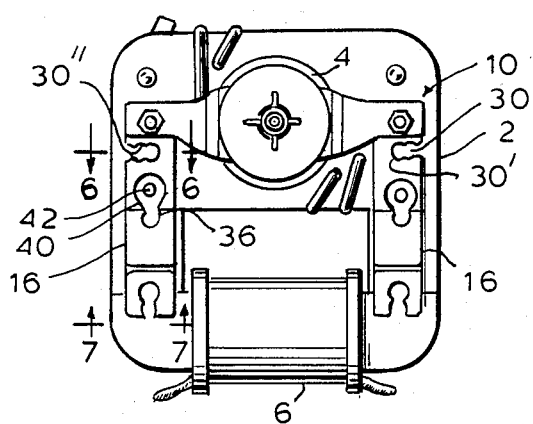
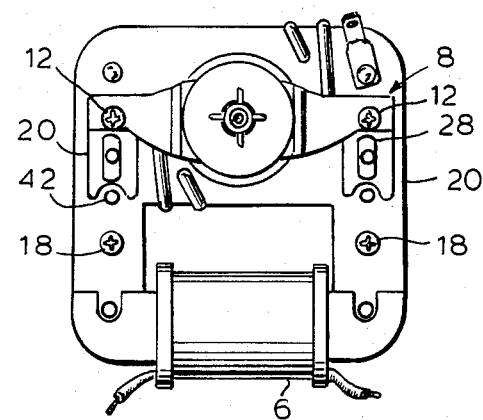
Fig. 1
Fig. 2
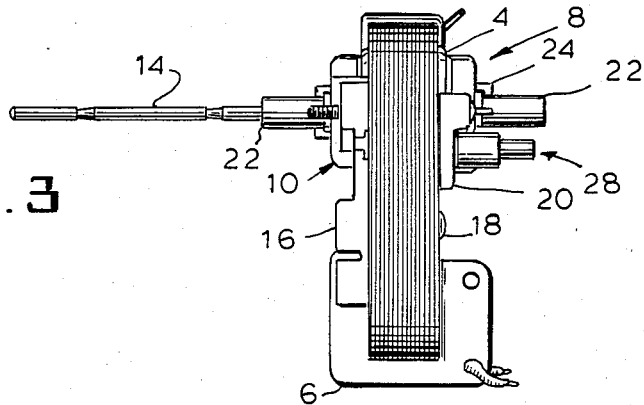
Fig. 3
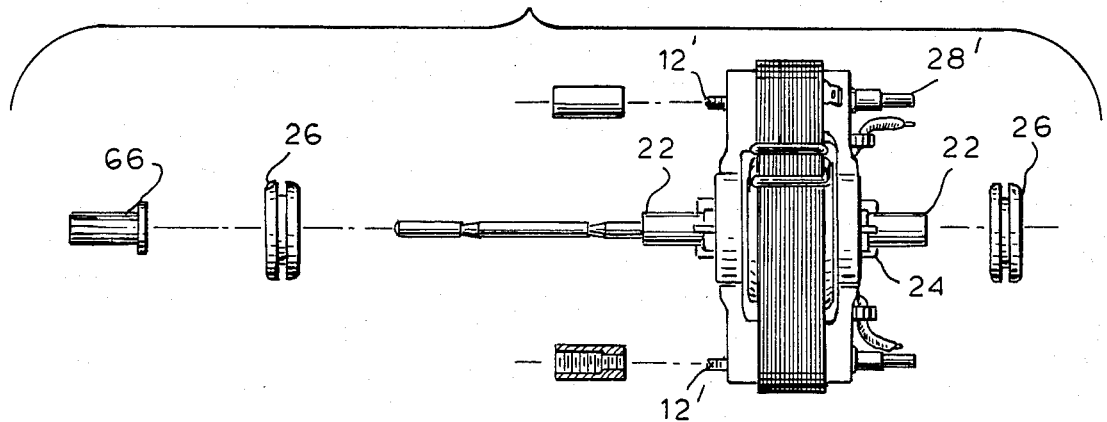
Fig. 4

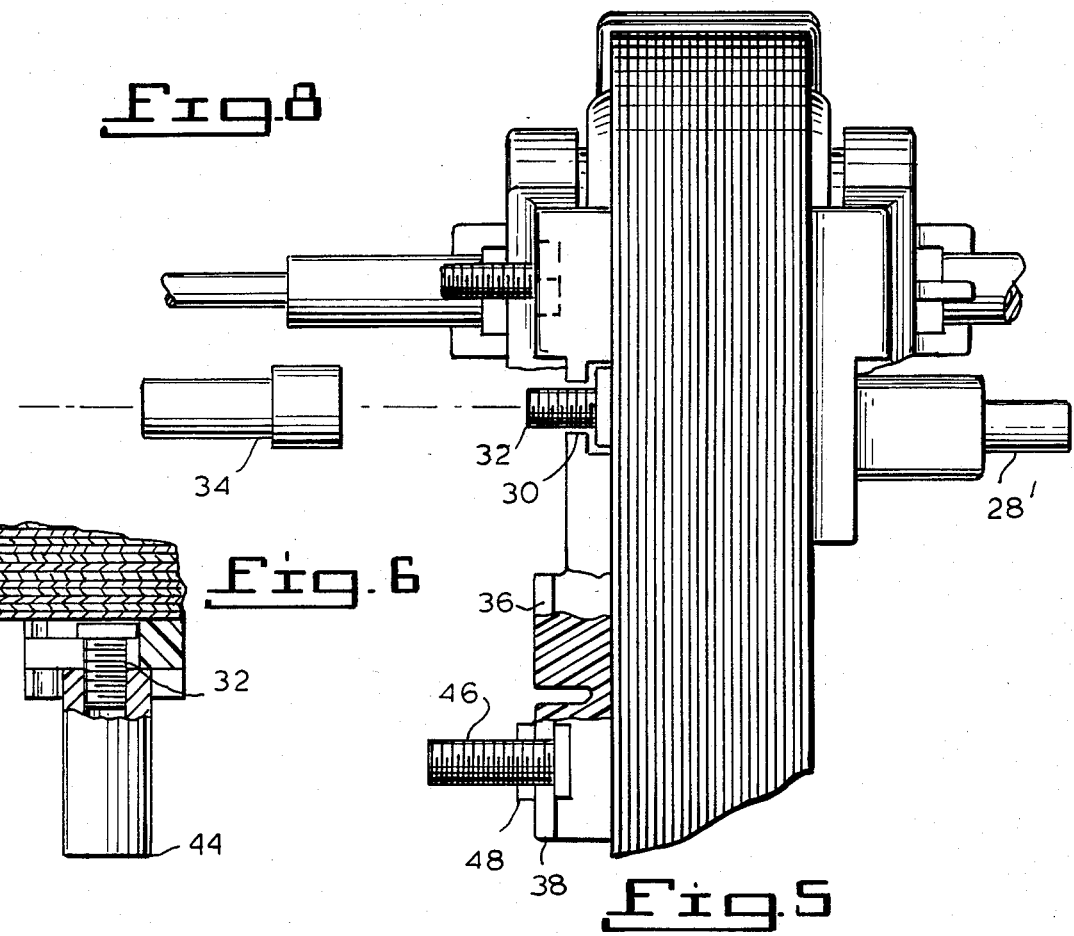
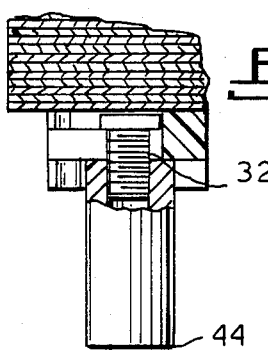
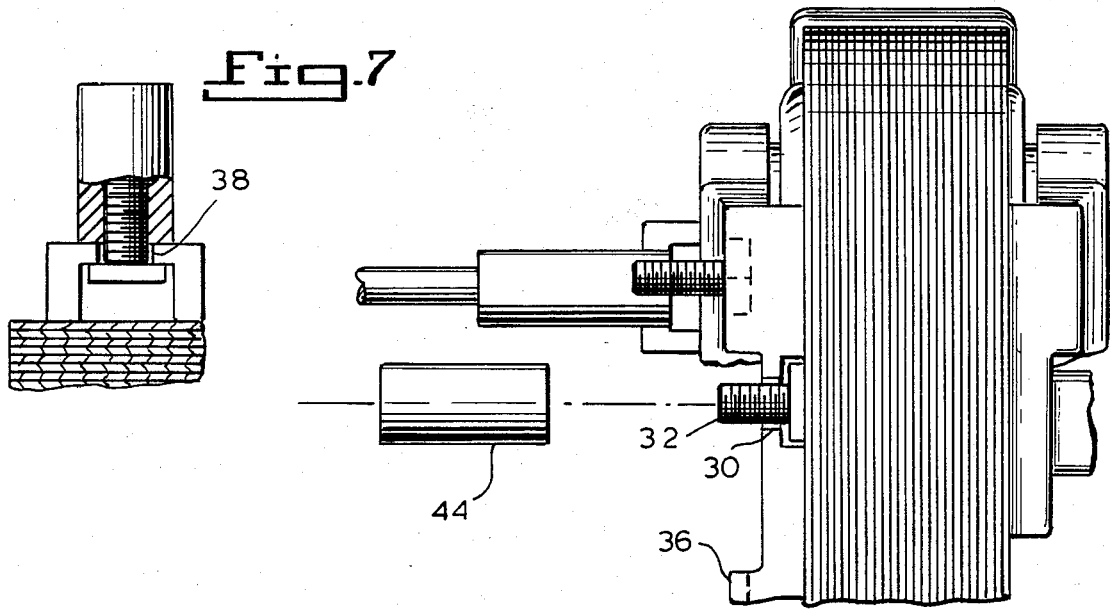

UNIVERSALLY MOUNTABLE MOTORS

This invention relates to universally mountable motors.

The conventional domestic refrigerator includes an evaporator which is equipped with a fan. The fan is driven by a small electric motor. Although many refrigerator manufacturers employ a fan motor of much the same physical size and having much the same electrical and drive characteristics, the different manufacturers employ different systems for mounting the fan motor in the refrigerator. This presents a difficulty to suppliers of replacement parts, in that while the fan motor of one refrigerator may be of substantially the same size and have substantially the same electrical and mechanical characteristics as the fan motor of another manufacturer's refrigerator, the difference in mounting systems precludes interchangability of the motors. Consequently, replacement part manufacturers produce fan motors having mounting brackets which render the motors universally mountable. By universally mountable is meant that the motor is compatible with several different mounting systems. U.S. Pat. Nos. 3,746,289 and 4,076,196 relate to universally mountable motors.

According to the present invention there is provided a universally mountable motor comprising an armature having first and second opposite faces and defining a cylindrical bore, first and second bearing brackets fitted to the armature at the first and second faces respectively and spanning the bore, bearing means mounted in the first and second bearing brackets and defining a common axis of rotation which is coaxial with the bore, and a rotor fitted in the bore and supported by the bearing means to rotate in the bore, the bearing brackets being secured to the armature by means of bolts, each of which has a threaded end which projects from one of the brackets, and said first bracket being formed with wings which extend parallel to one another on opposite sides of said axis and are formed each with at least one undercut slot, and the motor further comprising a screw for fitting in said slot and having a threaded portion which projects from the bracket when the screw is so fitted, and at least one stand-off for fitting to each of said screws.

For a better understanding of the invention, and to show how the same may be carried into effect, reference will now be made, by way of example, to the accompanying drawings in which:

FIG. 1 is a front elevation of a universally mountable motor;

FIG. 2 is a rear elevation of the motor;

FIG. 3 is a side elevation of the motor;

FIG. 4 is a top plan view of the motor showing mounting accessories exploded therefrom;

FIG. 5 is an enlarged, partly cut-away, side elevation of the motor showing mounting accessories exploded therefrom;

FIGS. 6 and 7 are sectional views taken on the lines VI—VI and VII—VII of FIG. 1 and showing mounting accessories;

FIG. 8 is a view similar to FIG. 5 showing further mounting accessories;

Figure 9:
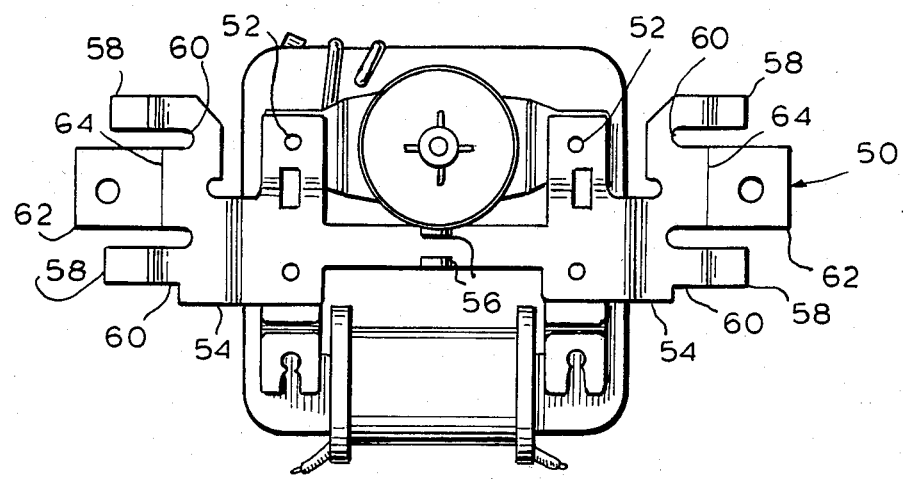
FIG. 9 is a front elevation of the motor showing a mounting bracket.
Figure 10:
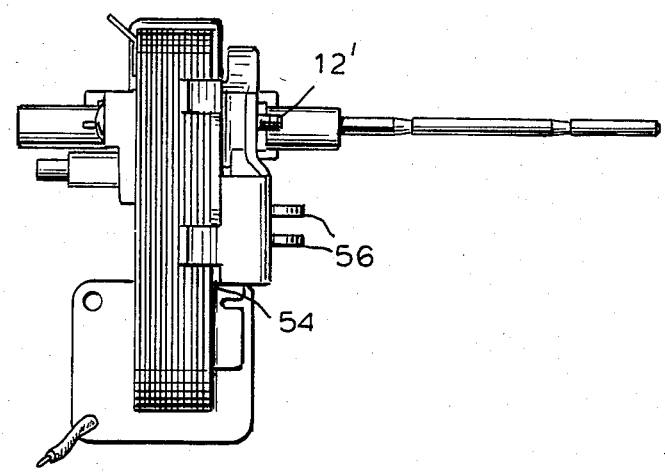
FIG. 10 is a side elevation of the motor showing the mounting bracket.

The illustrated motor comprises the conventional laminated armature 2 formed with a bore in which rotor 4 is mounted and provided with coil 6 having terminals for connection to an AC source. Bearing brackets 8 and 10 of injection molded synthetic plastic material are secured to the armature 2 at the front and rear thereof by means of bolts 12 which extend through the rear bracket 8, the armature 2 and the front bracket 10 and project to the front of the motor. Each of the brackets 8 and 10 spans the bore of the armature and incorporates a bearing in which the shaft 14 of the rotor is fitted.

The front bearing bracket 10 has two wings 16 which may be integral with bracket 10 so as to constitute a single part. Wings 16 extend downwardly from the bolts 12 along the front face of the armature, and these wings are retained against the front face of the armature by means of bolts 18 extending through the armature from the rear face thereof and engaging the wings. The rear bracket 8 is also provided with wings 20, but these are substantially shorter than the wings 16.

The motor is designed to be universally mountable. The different mounting systems with which the motor is compatible will now be described.

(a) One type of mounting system employs hubs which are coaxial with the rotor and are fitted in cradles for resilient grommets. In order to permit use of the illustrated motor with this mounting system, each of the brackets 8 and 10 includes an integral hub 22. Each hub is secured to the remainder of the bracket by means of four narrow webs 24. Resilient grommets 26 (FIG. 4) are fitted on the hubs respectively, and the motor is fitted in the mounting system so that the two grommets rest in respective cradles (not shown). The hubs can be removed if necessary to make the motor compatible with other mounting systems, by snipping the webs 24.

(b) Some mounting systems employ threaded studs at the front of the motor and disposed at opposite sides respectively of the rotor and in the horizontal plane of the rotor. The illustrated motor is rendered compatible with this type of mounting system by utilizing the projecting ends 12' of the bolts 12. One such system requires the use of a threaded stand-off in conjunction with the stud, and the illustrated motor can be rendered compatible with this system simply by screwing appropriate stand-offs onto the projecting ends of 12', as shown in FIG. 4.

(c) A third type of mounting system employs threaded stand-offs at the front of the motor on opposite sides of the rotor and positioned below the axis of the rotor (not shown). The illustrated motor can be used with several systems of this type.

(1) Each of the wings 16 is formed with an undercut slot 30 (FIG. 5) having a part-circular end 30' (FIG. 1) and a pair of opposed part-circular recesses 30". The slots 30 are undercut in order to enable them to accommodate T screws 32 with substantially rectangular heads. The T screws are fitted with their threaded portions either in the part-circular ends 30' respectively or between respective pairs of recesses 30". An appropriate threaded stand-off 44 is then fitted on each T screw.

(2) Each of the wings 16 is further formed with additional undercut slots 36 and 38 (FIGS. 7 and 8) at lower positions. These slots are used in conjunction with T screws and stand-offs in much the same way as the slots 30.

(3) Each of the wings 16 is further formed with a hole 40 (FIG. 1) which is coaxial with a hole 42 in the armature 2. A bolt is fitted through the hole 42 from the rear face of the armature so that it projects from the front face of the armature into the hole 40 of the wing, and a threaded stand-off is fitted on the projecting end of the bolt. Because, using this system, no attachments are made to the wings themselves, the bolts 18 may be used.

(d) Another type of mounting system employs pins at the front and rear of the motor. The illustrated motor is rendered compatible with this system by use of the rear posts 28, which terminate in pins 28' and pin-mount stand-offs 34 (FIG. 8) fitted to T screws located in the part-circular ends of the undercut slots 30. Incidentally, it is usually necessary to remove the posts 28 when the motor is used with the mounting system referred to in paragraph (a) above. This can be easily effected with cutting pliers.

(e) A fifth type of mounting system employs threaded studs which are located on each side of the rotor but below the level thereof. The illustrated motor is rendered compatible with this mounting system by use of long T screws 46 (FIG. 8) fitted in the undercut slots 38 and held therein by means of nuts 48.

(f) A further type of system employs a mounting bracket which is secured to the motor, and the illustrated motor is rendered compatible with several systems of this type by use of a metal bracket 50 (FIG. 9) having numerous opening and clip-off parts. The bracket is attached to the motor by placing the mounting holes 52 over the projecting ends 12' of the bolts 12 and securing with nuts.

(1) One type of system employing the bracket 50 relies upon a projecting tongue 56 located below the axis of the rotor. In this type of mounting system, the ends of the bracket are broken off at the point 54 and one of the tongues 56 is also broken off, depending upon the desired location of the tongue to be used.

(2) A second type of system uses lateral flanges, and to render the illustrated motor compatible with this system, the tongues 58 are removed at the point 60 and the tongues 56 are also removed, leaving the flanges 62.

(3) A third type of system employs dual side tongues, and the illustrated motor is rendered compatible with this system by use of the tongues 58. The flanges 62 are broken off at the point 64 and the tongues 56 are also broken off, leaving the tongues 58.

The shaft 14 of the illustrated motor has a diameter of ⅛ inch. The motor can be used to replace a motor having a 3/16 inch diameter shaft by fitting a sleeve 66 (FIG. 4), having a 3/16 inch external diameter, onto the shaft.

It will be appreciated from the foregoing that the kit of parts comprising the motor and the various grommets, T screws, stand-offs, nuts and the metal bracket 50 render the motor universally mountable, in that the motor is compatible with several different mounting systems.

It will be appreciated that the invention is not restricted to the specific motor which has been described and illustrated, since variations may be made therein without departing from the invention as defined in the appended claims. For example, the bearing brackets need not be made of injection molded plastic material but could be made of other suitable material, such as die cast metal.

We claim:

1. A universally mountable motor comprising an armature having first and second opposite faces and defining a cylindrical bore, first and second bearing brackets fitted to the armature at the first and second faces respectively and spanning the bore, bearing means mounted in the first and second bearing brackets and defining a common axis of rotation which is coaxial with the bore, and a rotor fitted in the bore and supported by the bearing means to rotate in the bore, the bearing brackets being secured to the armature by bolts, each of which has a threaded end which projects from one of the brackets and said bracket being formed with wings which extend parallel to one another on opposite sides of said axis and are formed each with at least one undercut slot, and the motor further comprising a screw for fitting in said slot and having a threaded portion which projects from the bracket when the screw is so fitted, and at least one stand-off for fitting to each of said screws, the second bearing bracket being formed with pins which project from the bracket away from the armature and parallel to the axis of rotation of the rotor, said pins being disposed equidistant from the axis of rotation and at opposite sides of the rotor.

2. A motor as claimed in claim 1, wherein the screws are positionable in the respective slots substantially coaxially with said pins respectively, and the stand-offs are pin-mount stand-offs.

3. A motor as claimed in claim 1, further comprising a mounting bracket which is securable to one of the bearing brackets and includes at least one tongue portion which extends parallel to the axis of rotation when the mounting bracket is secured to the bearing bracket, first and second flanges projecting to opposite sides respectively of the armature, and first and second pairs of tongues projecting to opposite sides respectively of the armature, the first tongue portion, the flanges and the pairs of tongues being removable from the mounting bracket independently to one another.

4. A motor as claimed in claim 3, wherein each flange portion is removable from the mounting bracket as a single unit with one of the pairs of tongue portions.

5. A universally mountable motor comprising an armature having first and second opposite faces and defining a cylindrical bore, first and second bearing brackets fitted to the armature at the first and second faces respectively and spanning the bore, bearing means mounted in the first and second bearing brackets and defining a common axis of rotation which is coaxial with the bore, and a rotor fitted in the bore and supported by the bearing means to rotate in the bore, the bearing brackets being secured to the armature by bolts, each bearing bracket having a hub portion projecting coaxially with the rotor in the direction away from the other bracket, and resilient grommet for fitting on each hub, each of the bolts having a threaded end which projects from one of the brackets and said first bracket being integrally formed with wings which extend parallel to one another on opposite sides of said axis and are formed each with at least one undercut slot, and the motor further comprising a screw for fitting in said slot and having a threaded portion which projects from the bracket when the screw is so fitted, and at least one stand-off for fitting to each of said screws.

6. A motor as claimed in claim 5, wherein said hubs are detachable from the respective bearing brackets.

7. A motor as claimed in claim 5, further comprising a mounting bracket which is securable to one of the bearing brackets and includes at least one tongue portion which extends parallel to the axis of rotation when the mounting bracket is secured to the bearing bracket, first and second flanges projecting to opposite sides respectively of the armature, and first and second pairs of tongues projecting to opposite sides respectively of the armature, the first tongue portion, the flanges and the pairs of tongues being removable from the mounting bracket independently to one another.

8. A motor as claimed in claim 7, wherein each flange portion is removable from the mounting bracket as a single unit with one of the pairs of tongue portions.

9. A universally mountable motor comprising an armature having first and second opposite faces and defining a cylindrical bore, first and second bearing brackets fitted to the armature at the first and second faces respectively and spanning the bore, bearing means mounted in the first and second brackets and defining a common axis of rotation which is coaxial with the bore, and a rotor fitted in the bore and supported by the bearing means to rotate in the bore, the bearing brackets being secured to the armature by bolts, each of which has a threaded end which projects from one of the brackets and said first bracket being formed with wings which extend parallel to one another on opposite sides of said axis and are formed each with at least one undercut slot, and the motor further comprising a screw for fitting in said slot and having a threaded portion which projects from the bracket when the screw is so fitted, the wings being integral with said first bracket so as to constitute with said first bracket a single part, and at least one stand-off for fitting to each of said screws.

10. A universally mountable motor comprising an armature having first and second opposite faces and defining a cylindrical bore, first and second bearing brackets fitted to the armature at the first and second faces respectively and spanning the bore, bearing means mounted in the first and second brackets and defining a common axis of rotation which is coaxial with the bore, and a rotor fitted in the bore and supported by the bearing means to rotate in the bore, the bearing brackets being secured to the armature by bolts, each of which has a threaded end which projects from one of the brackets and said first bracket being formed with wings which extend parallel to one another on opposite sides of said axis and are formed each with at least one undercut slot, said screw having a head with a dimension exceeding a width of said slot, and the motor further comprising a screw for fitting in said slot and having a threaded portion which projects from the bracket when the screw is so fitted, and at least one stand-off for fitting to each of said screws.

11. A universally mountable motor comprising an armature having first and second opposite faces and defining a cylindrical bore, first and second bearing brackets fitted to the armature at the first and second faces respectively and spanning the bore, bearing means mounted in the first and second brackets and defining a common axis of rotation which is coaxial with the bore, and a rotor fitted in the bore and supported by the bearing means to rotate in the bore, the bearing brackets being secured to the armature by bolts, each of which has a threaded end which projects from one of the brackets and said first bracket being integrally formed with wings which extend parallel to one another on opposite sides of said axis and are formed each with at least one undercut slot, and the motor further comprising a T screw for fitting in said slot and having a threaded portion which projects from the bracket when the screw is so fitted, and at least one stand-off for fitting to each of said screws.

12. A universally mountable motor comprising an armature having first and second opposite faces and defining a cylindrical bore, first and second bearing brackets fitted to the armature at the first and second faces respectively and spanning the bore, bearing means mounted in the first and second brackets and defining a common axis of rotation which is coaxial with the bore, and a rotor fitted in the bore and supported by the bearing means to rotate in the bore, the bearing brackets being secured to the armature by bolts, each of which has a threaded end which projects from one of the brackets and said first bracket being integrally formed with wings which extend parallel to one another on opposite sides of said axis and are formed each with at least one undercut slot, and the motor further comprising a screw for fitting in said slot and having a threaded portion which projects from the bracket when the screw is so fitted, said screw having a substantially rectangular head, and at least one stand-off for fitting to each of said screws.

13. A universally mountable motor comprising an armature having first and second opposite faces and defining a cylindrical bore, first and second bearing brackets fitted to the armature at the first and second faces respectively and spanning the bore, bearing means mounted in the first and second brackets and defining a common axis of rotation which is coaxial with the bore, and a rotor fitted in the bore and supported by the bearing means to rotate in the bore, the bearing brackets being secured to the armature by bolts, each of which has a threaded end which projects from one of the brackets and said first bracket being formed with wings which extend parallel to one another on opposite sides of said axis and are formed each with at least one undercut slot, and the motor further comprising a screw for fitting in said slot and having a threaded portion which projects from the bracket when the screw is so fitted, and at least one stand-off for fitting to each of said screws said screw having a head dimension to fit within a first region of said slot which is undercut, said head having a dimension large enough so that said screw is retained by parts of said wing which define a second region of said slot.

14. A motor as claimed in claim 1, wherein each wing of the bracket is formed with a hole and the armature is formed with holes which are coaxial with the holes in the wings respectively, and the motor further comprising first and second bolts which can be fitted into the holes of the armature from the rear face thereof to project from those holes into the holes formed in the wings, said stand-off being threadable onto the projecting end of the bolts so as to enter the holes in the wings and be secured against the first face of the armature.

15. A motor as claimed in claim 14, wherein the armature is formed with two further holes and the wings are formed with internally threaded holes which are coaxial with said two further holes respectively, said bolts being insertable through said further holes into threaded engagement with the wings for securing the wings against the first face of the armature.

* * * * *